(12) United States Patent
Nakabayashi et al.

(10) Patent No.: US 6,843,042 B2
(45) Date of Patent: Jan. 18, 2005

(54) CONTAINER PACKAGING METHOD

(75) Inventors: Kenichi Nakabayashi, Tsurugashima (JP); Kazuhiko Goto, Tsurugashima (JP)

(73) Assignee: Daisey Machinery Co., Ltd., Saitama-ken (JP)

( * ) Notice: Subject to any disclaimer, the term of this patent is extended or adjusted under 35 U.S.C. 154(b) by 0 days.

(21) Appl. No.: 10/247,627

(22) Filed: Sep. 20, 2002

(65) Prior Publication Data
US 2003/0056475 A1 Mar. 27, 2003

(30) Foreign Application Priority Data
Sep. 21, 2001 (JP) ........................................ 2001-288969

(51) Int. Cl.[7] ................................................ B65B 7/28
(52) U.S. Cl. ............................ 53/485; 53/412; 156/69
(58) Field of Search .......................... 53/412, 476, 478, 53/485, 484, 329.2, 329.3, 333, 373.2, 133.8, 329; 156/69, 290, 291

(56) References Cited

U.S. PATENT DOCUMENTS

| | | | | |
|---|---|---|---|---|
| 3,069,273 A | * | 12/1962 | Wayne ........................ 53/412 |
| 3,783,089 A | * | 1/1974 | Hurst et al. ............... 220/359.3 |
| 3,865,302 A | * | 2/1975 | Kane ........................ 229/123.1 |
| 3,910,410 A | * | 10/1975 | Shaw ........................ 220/359.3 |
| 3,942,676 A | * | 3/1976 | Beckers et al. ............. 220/270 |
| 4,605,142 A | * | 8/1986 | Itoh et al. ................. 220/359.4 |
| 4,689,099 A | * | 8/1987 | Ito et al. ....................... 156/69 |
| 4,913,307 A | * | 4/1990 | Takata et al. ............... 220/276 |
| 4,955,530 A | * | 9/1990 | Rigby et al. ............. 229/123.2 |
| 5,157,901 A | * | 10/1992 | Okamoto et al. ............. 53/478 |
| 5,334,272 A | * | 8/1994 | Takata et al. ................ 156/69 |
| 5,516,035 A | * | 5/1996 | Stone ....................... 229/123.2 |
| 5,868,307 A | * | 2/1999 | Calvert .................. 229/125.35 |

FOREIGN PATENT DOCUMENTS

WO      WO 93/19986     * 4/1992 ............. B65B/7/28

* cited by examiner

Primary Examiner—Eugene Kim
Assistant Examiner—Paul Durand
(74) Attorney, Agent, or Firm—Wenderoth, Lind & Ponack, L.L.P.

(57) ABSTRACT

A container packaging method is provided which ensures a sealing ability and yet has an easy opening ability. Between a container edge and a film covering an upper opening face of a container, a strip seal, having a portion sealed partially weakly at an outer side portion of a corner of the container edge, is formed and a double line seal is formed on the strip seal. An outer line seal has its corner end projected toward an outer side edge of the corner of the container edge. The outer line seal and an inner line seal are connected by a seal connection formed in a diagonal direction of the container. The inner line seal has its inner side edge at the corner of the container edge be of a cornered shape.

6 Claims, 2 Drawing Sheets

CONTAINER PACKAGING METHOD

BACKGROUND OF THE INVENTION

1. Field of the Invention

The present invention relates to a packaging method, wherein a container having a container edge, and being filled with an article, has an upper opening face thereof covered by a film and a seal of an overlapped portion of the container edge and the film is effected.

2. Description of the Prior Art

Nowadays, there are provided in markets an extremely large number of articles that are packaged in containers. Like tofu or bean curd, packaged in the containers are many articles by covering an upper opening face of the container, filled with the articles, with a film and effecting a seal of an overlapped portion of a flange-like container edge and the film.

With such articles that are packaged by covering the upper opening face of the container and effecting a seal of the overlapped portion of the container edge and the film, the articles can be tightly sealed in the container so as to be kept clean. Liquid or juice also can be sealed, and shapes of the articles can be maintained by strength or rigidity of the container. Thus, such packaging is widely employed for many kinds of articles.

With resect to packaged articles of the above-mentioned kinds, in order for packaged liquid or juice not to leak from a container, a sealing ability between the container edge upper surface and the film must be ensured. But, on the other hand, when articles are to be removed from the container, it is desirable that the film on the container can be easily and smoothly peeled off without an excessive force being applied. Especially, like packaged tofu, when articles are sealed in a container together with liquid or juice, it is particularly desired that the container can be opened only with a smooth opening action so that the liquid or juice will not spill from the container when the film is being removed.

In order to ensure strength, sealing ability, and the like, simultaneously, the container and film, respectively, used for an article packaging are usually formed of a laminate in which a plurality of sheets or films are laminated. For example, the container is formed of a multi-layer structure in which a core portion made of polystyrene is sandwiched between upper and lower surfaces made of polypropylene, and the film is a laminate sheet made of nylon and polypropylene, so that the container and the film are joined together by a seal via polypropylene surfaces.

As the container and the film are so formed by the multi-layer sheet or multi-layer film, if they are joined together too strongly, a sealed portion is hardly peeled at a time of opening the container, so that an interlayer peeling may occur in the laminated film or container. Thus, the container cannot be smoothly opened and there often results a problem, such as jumping out or spilling of articles or liquid from the container. Or, otherwise there results a problem, such as tearing of the film in middle of the sealed portion between the container and the film because of difficulty in opening the container along the sealed portion, or breaking of the film on the container so as to cause a half-opening of the container. Hence, there has often been caused such a case in that a container has to be opened by using cutlery.

Also, in order to open the container, as the film on the container edge has only a small pulling tab at a corner portion of the container, it is not always easy to lift the small tab to peel the sealed portion and, moreover, a considerable force is required to pull the tab. Hence, at the very moment when the sealed portion begins to peel or when the film is suddenly broken, the container is necessarily moved, which often results in scattering liquid or juice from the container or upsetting the container.

It is therefore an object of the present invention to provide a packaging method, wherein a container having a container edge, and being filled with an article, has an upper opening face thereof covered by a film and a seal of an overlapped portion of the container edge and the film is effected, by which a sealing ability at a sealed portion is ensured and the film on a container edge upper surface can be smoothly and easily removed along the sealed portion without an excessive force being applied, so that a container package exhibiting an easy opening ability is obtained.

SUMMARY OF THE INVENTION

In order to achieve the above-mentioned object, the present invention provides a container packaging method, wherein a container having a container edge, and being filled with an article, has an upper opening face thereof covered by a film and a seal of an overlapped portion of the container edge and the film is effected. The method comprises effecting a seal at a corner of the container edge, wherein the seal has a corner end projected toward an outer side edge of the corner of the container edge.

According to the packaging method of the present invention, at the corner of the container edge, the seal between the container edge upper surface and the film, covering the container edge upper surface, has its corner end projected toward the outer side edge of the corner of the container edge. Thus, when the film is being lifted so as to be peeled from the corner of the container edge, a peeling force applied to the film concentrates on the projected end of the seal and the seal is easily peeled from the projected end. Hence, starting from the projected end, the film that is attached to the container edge upper surface by fusion can be smoothly peeled along the seal.

In the container packaging method according to the present invention, at the corner of the container edge, it is preferable that a non-sealed portion is provided between the outer side edge of the corner of the container edge and an end of the seal that is projected toward the outer side edge of the corner of the container edge. By so doing, when the film is to be peeled at the corner portion, a peeling force is easily concentrated on the projected end of the seal and the film can begin to be easily and smoothly peeled.

Also, by providing the above non-sealed portion at the corner outer side of the container, that is of a laminate construction, when the film, that is attached to the container edge upper surface by fusion, is to be peeled therefrom, there is caused no opportunity of an interlayer peeling that begins from a container end portion. Hence, only a fused portion of the film can be peeled without causing interlayer peeling of the container.

Also, in the packaging method according to the present invention, at a corner of a container edge, it is preferable that a seal has its inner side edge formed not as a rounded shape, but rather as a cornered shape, i.e. is angled. By so doing, when the film further proceeds to be peeled from the container edge, a peeling force is concentrated on an apex of the cornered shape and a container edge upper surface, to which the film which is attached by fusion to form the seal, is separated or cut off from a fused portion at a place of the apex of the cornered shape. Thus, without causing interlayer peeling of the container, the film can be continuously peeled therefrom.

Also, in the container packaging method according to the present invention, a seal between a container edge and a film may be formed as a line seal so that the seal is tightly effected. In this case also, the film can be easily peeled along the seal starting from an end of the seal that is projected toward a corner end of the container edge.

In this case, in order to ensure sealing ability, the line seal may be formed as a multiple line seal having a plurality of individual line seals. If the plurality of individual line seals at the corner of the container edge are connected to one another in a substantially diagonal direction of the container, a peeling force is smoothly transmitted to an inner one of the line seals along the diagonal direction. Thus, a container package in which film can be easily and smoothly peeled can be obtained.

Furthermore, in order to achieve the abovementioned object, the present invention provides a container packaging method by which a seal structure ensuring a sufficient sealing ability is constructed between a container edge and a film covering an upper opening face of the container such that, in addition to any of line seals as mentioned above, a strip seal is formed that has a portion that is sealed partially weakly at an outer side portion of a corner of the container edge, so that an overlapped seal of the strip seal and the line seals is obtained.

Because the strip seal formed by the packaging method of the present invention has a portion that is partially weakly sealed at the outer side portion of the corner of the container edge, the film can be easily and smoothly peeled from the corner of the container. When peeling reaches the line seal, the line seal can be easily and smoothly peeled from the end of the seal that is projected toward the outer side edge of the corner of the container edge, as mentioned above.

Also, in the case where the line seal is formed as multiple line seals, a peeling force is smoothly transmitted to the inner one of the line seals along the diagonal direction at the corner of the container edge, and the film can be easily peeled therefrom.

As described above, according to the container packaging method of the present invention, a container package ensuring a sealing ability, and yet having an easy opening ability can be produced.

DESCRIPTION OF THE PREFERRED EMBODIMENTS

Herebelow, a packaging method according to the present invention will be described more concretely based on an embodiment shown in the figures.

The container packaging method of the present invention to be described below is an example based on the embodiment comprising two steps to form a seal between a container edge and a film that covers an upper opening face of a container.

(First Step)

Figure 1:
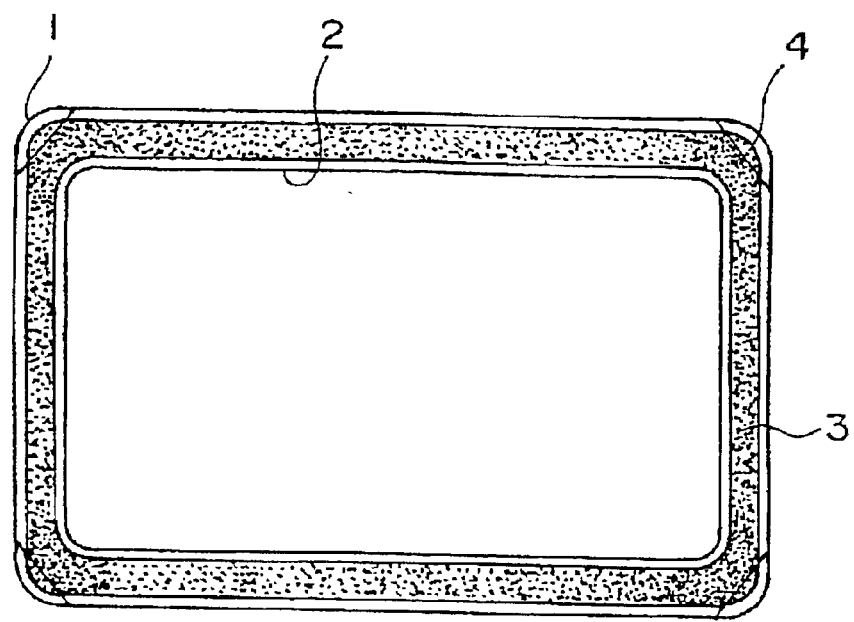
FIG. 1 is a plan view showing a strip seal formed by a first step in an embodiment according to a method of the present invention.

In a first step, a strip seal is formed between an upper surface of a container and a film. In FIG. 1, which is a plan view showing the strip seal formed by this first step, numeral 1 designates a container edge and numeral 2 designates an article, like tofu, filled into the container. An upper opening face of the container is covered by the film and a strip seal 3 is formed between the film and the container edge upper surface. At a container edge outer side portion of each of four corners of the strip seal 3, there is formed a weakly sealed portion 4.

In order to form the strip seal 3, the film, while being lapped over the container edge 1, is pinched between a sealer and a platen so as to be sealed as is conventional in the art. Also, the weakly sealed portion 4 may be formed by using a sealer or platen having partially concave portions. Thus, the strip seal 3 is formed having the weakly sealed portions 4 at the four corners from which the film begins to be peeled when the container package is to be opened.

In the course of forming the strip seal 3, fractions or scraps of the article 2, that have attached to the container edge 1 at a time of filling the article 2 into the container, are removed by application of a sealing pressure. Needless to mention, sealing conditions such as sealing pressure, temperature, and the like are to be set to appropriate values in consideration of materials of the container and the film, kinds of the article to be filled into the container, sizes of the container, strength of sealing ability, and the like.

(Second Step)

Subsequently, in a second step, a double line seal is formed on the strip seal 3, which has been formed by the above-mentioned first step. The second step will be described below with reference to FIGS. 2 and 3.

Figure 2:
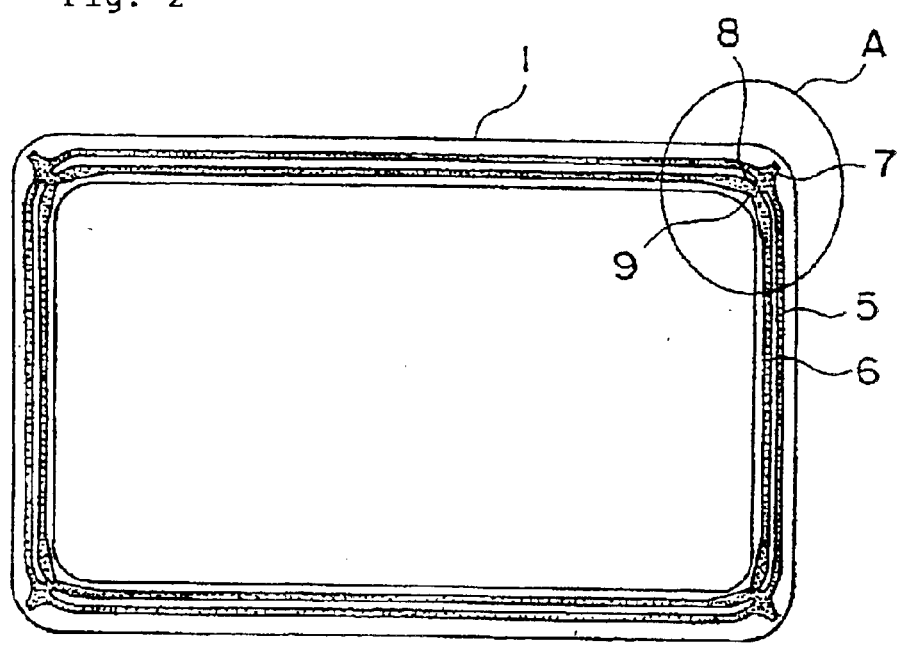
FIG. 2 is a plan view showing a line seal formed by a second step in the embodiment of FIG. 1.
Figure 3:
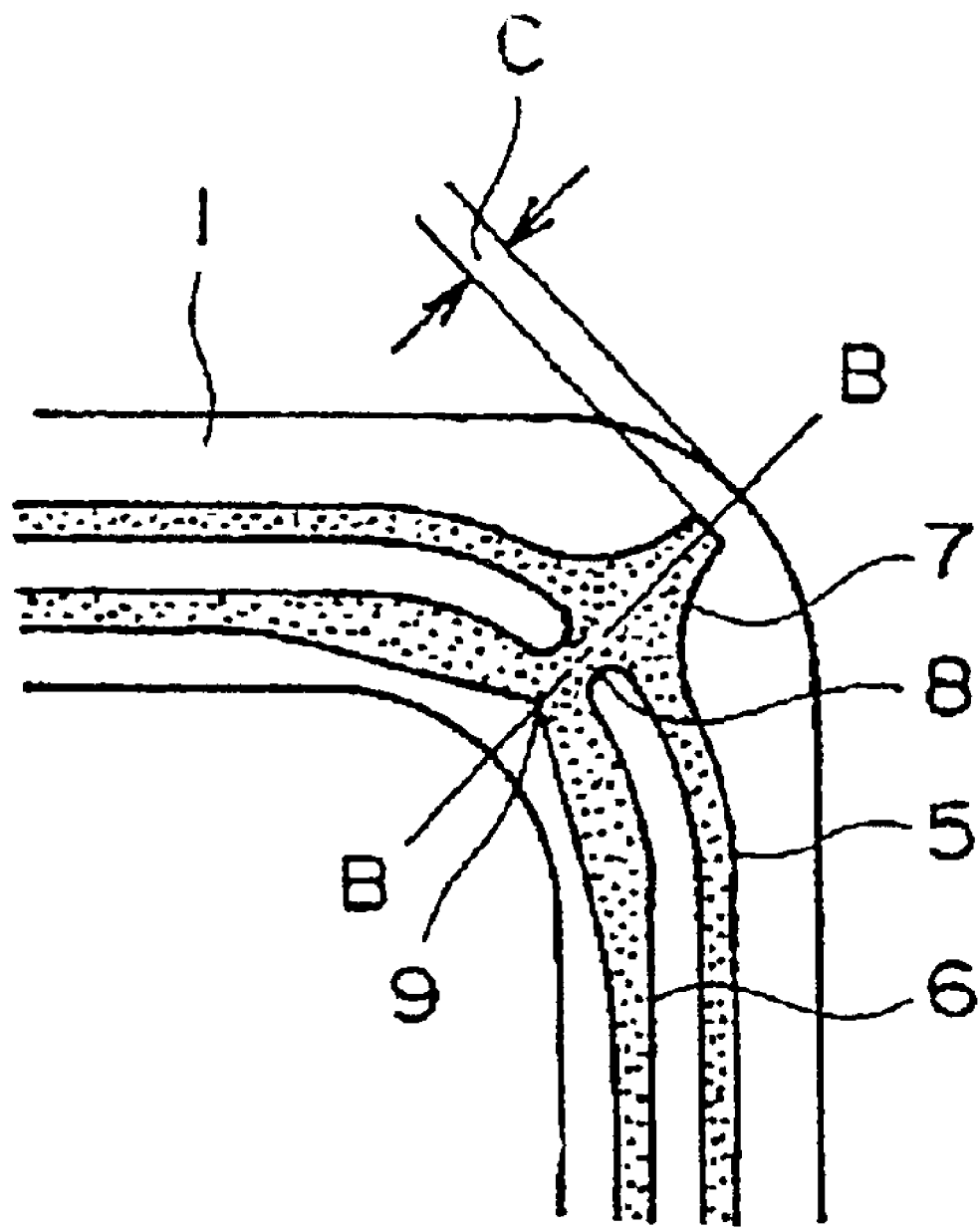
FIG. 3 is an enlarged plan view of corner portion A of FIG. 2.

In FIGS. 2 and 3, numerals 5 and 6 designate generally parallel line seals that define the double line seal formed between the container edge 1 and the film, wherein 5 is an outer line seal and 6 is an inner line seal. The double line seal 5, 6 is provided as a seal that is stronger than the strip seal 3 and is formed so as to be lapped over the strip seal 3. Incidentally, illustration of the strip seal 3 is omitted in FIGS. 2 and 3 for ease of understanding.

At each of the corners of the container edge 1, the outer line seal 5 has a seal projection 7 that projects toward an outer side edge of the corner of the container edge 1. There is provided a non-sealed portion C between a projecting end of the seal projection 7 and the outer side edge of the corner of the container edge 1. Also, at each of the corners of the container edge 1, there is provided a seal connection 8 that connects the outer line seal 5 and the inner line seal 6 in a substantially diagonal direction B—B of the container. An inner side edge of the inner line seal 6 at each of the corners of the container edge 1 is formed not of a rounded shape, but rather as a cornered shape 9, i.e. the inner side edge is angled.

Needless to mention, sealing conditions such as sealing pressure, temperature, and the like for forming the line seals 5, 6 are to be set to appropriate values in consideration of materials of the container and the film, kinds of the article to be filled in the container, sizes of the container, strength of sealing ability, and the like.

According to the container packaging method of the present invention as described above with respect to the embodiment, there are formed the strip seal 3 and the double line seal 5, 6 between the container edge 1 and the film thereon, and the strip seal 3 has the weakly sealed portion 4, at the outer side portion of each of the corners of the container edge 1. Thus, when the film covering the container upper face is grasped to be lifted at a corner end of the container, the film can be easily peeled from the weakly sealed portion 4.

Moreover, the outer line seal 5 has the seal projection 7 projecting toward the outer side edge of each of the corners of the container edge 1. Hence, when the film covering the container upper face is lifted at the corner end, as mentioned above, the film is first lifted at the non-sealed portion C that is provided between the projecting end of the seal projection 7 and the outer side edge of the corner of the container edge 1. Thereby, a lifting force acting on the film concentrates on the projecting end of the seal projection 7, so that the projecting end of the seal projection 7 is smoothly peeled and, starting from peeling of the seal projection 7, the outer line seal 5 is also smoothly peeled along a line of the outer line seal 5.

The peeling force of the outer line seal 5 is transmitted to an outer side of a corner of the inner line seal 6 via the seal connection 8, and the inner line seal 6 is thereby smoothly peeled starting from the seal connection 8. The inner side edge of the inner line seal 6 is formed as the cornered shape 9, and thus a fusion portion forming the seal between the upper surface of the container edge 1 and the film is cut off at an apex of the cornered shape 9, and there is caused no interlayer peeling at a sealed portion of container material that forms part of a laminate.

Subsequently, the film is further peeled smoothly along the strip seal 3 and the line seals 5, 6.

Thus, according to the packaging method of the present invention as described with respect to the embodiment, a sealing ability between the container edge 1 and the film covering the container is sufficiently ensured by the strip seal 3 and a strong double line seal 5, 6.

In the seals formed as described above, the strip seal 3 is easily and smoothly peeled starting from the weakly sealed portion 4, the outer line seal 5 is easily and smoothly peeled starting from the projecting end of the seal projection 7, and the inner line seal 6 is easily and smoothly peeled starting from the seal connection 8.

Also, peeling force acting on the film is prevented from being transmitted to a sealed portion of a multilayer material of the container.

In the above, while the packaging method according to the present invention has been concretely described based on the embodiment with reference to the figures, the invention is by no means limited to that embodiment but may naturally be provided with various changes and modifications as to come within the scope of the appended claims.

For example, in the above described embodiment, the double line seal 5, 6 is formed in addition to the strip seal 3, but the strip seal may be omitted and only the double line seal 5, 6 can be provided. Also in this case, a line seal is not necessarily the double line seal 5, 6, and only line seal 5 of a single line can be provided.

Moreover, a line seal may be omitted, and only the strip seal may be provided if the strip seal has the seal projection that projects toward the outer side edge of the corner of the container edge 1 and has a desired sealing ability.

Also, in the embodiment as illustrated, the non-sealed portion C is provided between the outer side edge of the corner of the container edge 1 and the projecting end of the seal projection 7 that projects toward the outer side edge of the corner of the container edge 1 so that, when the film begins to be peeled at the corner, a peeling force applied to the film may surely act concentratedly on the projecting end of the seal projection 7. However, to provide this non-sealed portion C is not essential.

Furthermore, in the embodiment as illustrated, the present invention is applied to all of the four corners of the container edge 1 but, if a container package is made such that an opening starting place of the container is clearly indicated by an arrow or the like, then the present invention may be applied, for example, only to one corner, of the four, to which an indication of opening is clearly made.

What is claimed is:

1. A packaging method comprising:
   providing a container having an article therein, with said container having a rectangular edge that defines an opening of said container;
   covering said opening with a film; and
   line-sealing said film to said rectangular edge of said container such that formed are two generally parallel line seals, and a line seal portion at a corner of said rectangular edge, with
   (i) said line seal portion including a seal connection interconnecting said two generally parallel line seals along a substantially diagonal direction of said container,
   (ii) a part of said line seal portion projecting towards an outer end of said corner of said rectangular edge, and
   (iii) an inner part of said line seal portion being angled.

2. The packaging method according to claim 1, further comprising:
   strip-sealing said film to said rectangular edge such that a strip seal is formed, wherein
   (i) said strip seal overlaps said two generally parallel line seals and said line seal portion, and
   (ii) said strip seal includes a weak strip seal portion at an outer side portion of a corner of said edge.

3. The packaging method according to claim 2, wherein said weak strip seal portion and said line seal portion are at the same corner of said edge of said container.

4. The packaging method according to claim 3, further comprising:
   providing a non-sealed portion of said film between said outer end of said corner and said part of said line seal portion that projects toward said outer end of said corner.

5. The packaging method according to claim 1, further comprising:
   providing a non-sealed portion of said film between said outer end of said corner and said part of said line seal portion that projects toward said outer end of said corner.

6. The packaging method according to claim 5, further comprising:
   strip-sealing said film to said rectangular edge such that a strip seal is formed, wherein
   (i) said strip seal overlaps said two generally parallel line seals and said line seal portion, and
   (ii) said strip seal includes a weak strip seal portion at an outer side portion of a corner of said edge.

* * * * *